United States Patent

McQuarrie et al.

[15] 3,689,837
[45] Sept. 5, 1972

[54] POSITIONING MEANS FOR WATTHOUR METER FULL LOAD CALIBRATING SCREW

[72] Inventors: Alexander M. McQuarrie, Rochester; James J. Grady, Somersworth, both of N.H.

[73] Assignee: General Electric Company

[22] Filed: April 15, 1971

[21] Appl. No.: 134,299

[52] U.S. Cl. ................................324/152, 324/137
[51] Int. Cl. ..........................G01r 1/16, G01r 11/02
[58] Field of Search ..........................324/137, 152

[56] References Cited

UNITED STATES PATENTS

2,149,885  3/1939  Green ....................... 324/137
2,658,181  11/1953  Holmes et al. ............. 324/152

*Primary Examiner*—Alfred E. Smith
*Attorney*—Vale P. Myles, Francis X. Doyle, Frank L. Neuhauser, Oscar B. Waddell and Joseph B. Forman

[57] ABSTRACT

A full load calibration screw assembly for an electric watthour meter is provided with a generally straight resilient spring member that is releasably mounted between a pair of bosses integrally formed on the meter frame. The spring member is held in an operating position by the bosses which assures its easy and accurate alignment with helical threads cut on a full load calibrating screw for the meter. The spring member operates to retain the calibrating screw in position once it is manually adjusted to calibrate the meter.

9 Claims, 3 Drawing Figures

PATENTED SEP 5 1972    3,689,837
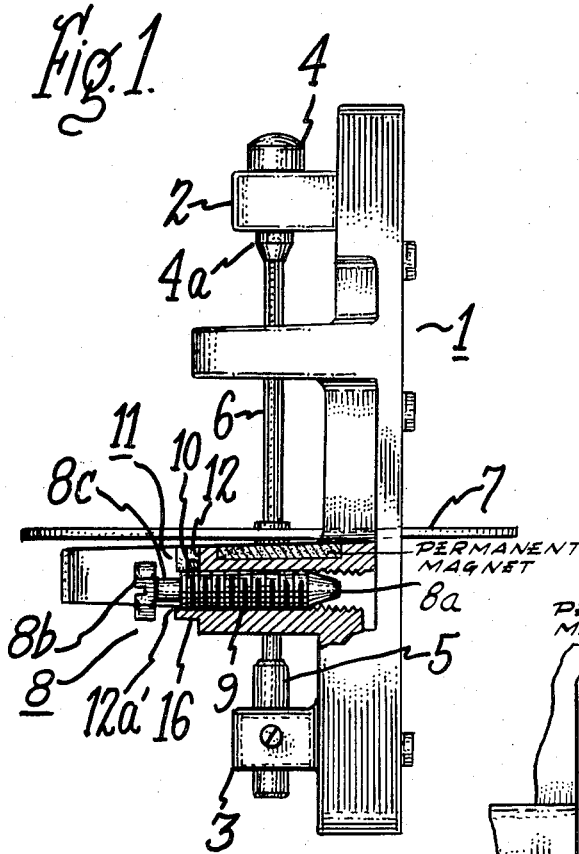
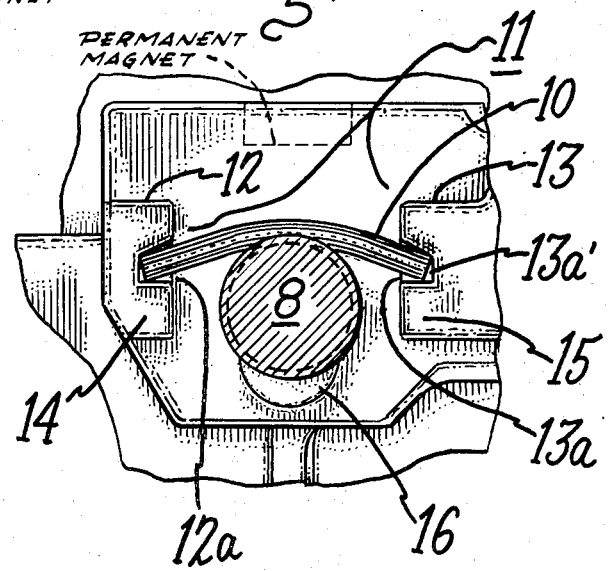
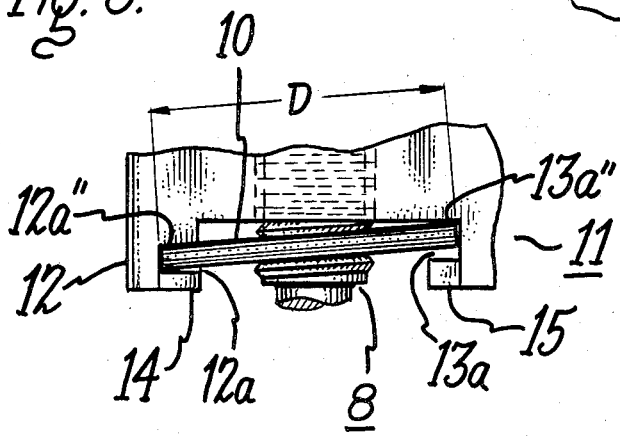
Inventors,
Alexander M. McQuarrie,
James J. Grady,
Vale P. Myles
by
Their Attorney.

3,689,837

POSITIONING MEANS FOR WATTHOUR METER FULL LOAD CALIBRATING SCREW

BACKGROUND OF THE INVENTION

It was generally well known, prior to the present invention in the watthour meter art, to provide full load calibrating screws for watthour meters with some form of resilient spring holding means. Such prior art holding means provided the dual function of retaining a calibrating screw in a preset position, against inadvertent movement, while at the same time enabling the screw to be manually adjusted against the holding tension of the spring. These prior art positioning springs took many different forms, but they all had one thing in common; namely, they were all formed of resilient spring members that included one or more bends in the stable-state configuration of the spring. In addition to this common characteristic of the prior art spring assemblies used to position meter calibrating screws, many such assemblies required the use of a separate detent or locking screw in order to hold the spring member in position against the full load calibrating screw of the meter. Consequently, in order to mount the spring in operating position, or to remove the spring from its operating position, it was generally necessary to remove or adjust the locking detent or screw to effect such movement of the spring.

An analysis of the various known types of spring assemblies used to position full load calibrating screws on watthour meters reveals several disadvantages that it would be desireable to overcome. A disadvantage common to all of the spring assemblies using a pre-formed spring stems from the fact that such springs are relatively expensive to manufacture, compared to the manufacture of a straight spring member. In addition, the calibration of the resilient force developed by such springs at a predetermined condition of load is more difficult to attain consistently in a mass production facility than is the equivalent calibration of a straight spring member. A further disadvantage of such prior art spring loaded positioning assemblies was that they failed to incorporate any means for assuring that the biasing spring member therein would be positioned in alignment with the threads of the screw being retained in position. Accordingly, the spring member frequently was not located in alignment with the threads of the calibrating screw, but instead could be moved to a position relative to the screw threads such that its holding friction would be extremely small. Therefore, it was possible that such screws could be inadvertently moved despite the biasing force of the spring exerted against it through such an inefficient contact surface area. Finally, the relatively complex nature of many prior art full load calibrating screw assembly positioning means made it particularly difficult to assemble their component parts. Of course, such increased difficulty resulted in an undesirable increase in manufacturing costs.

The present invention is intended to overcome the disadvantages of prior art mechanisms which are set forth above.

OBJECTS OF THE INVENTION

Accordingly, an object of the invention is to provide a full load calibrating screw assembly for an induction type electric meter, for example a watthour meter, which is economical to assemble and which reliably affords a consistent friction force between a biasing spring and a calibrating screw that is maintained in a preset position by the spring.

Another object of the invention is to provide a spring loaded calibrating screw positioning means that utilizes a single, generally straight spring member.

A further object of the invention is to provide a spring loaded calibrating screw positioning assembly having means for maintaining a positioning spring in friction contact with two sides of a helical thread formed in the calibrating screw, thereby to assure a consistent and relatively high frictional contact between the spring and the screw.

Still another object of the invention is to provide a spring loaded calibrating screw position assembly having means for maintaining a biasing spring in position within the assembly, during its manufacture, prior to the time that the spring is mechanically loaded by moving a calibrating screw into contact with it.

Yet another object of the invention is to provide a full load calibrating screw assembly for a watthour meter in which a calibrating screw having a tapered end is used in combination with a generally straight spring member to afford an assembly that is simple and economical to manufacture and at the same time is capable of providing consistent frictional contact between the screw and the spring during operation of the calibrating assembly.

Additional objects and advantages of the invention will become apparent to those skilled in the art from the description of it that is given herein.

BRIEF DESCRIPTION OF THE INVENTION

In one preferred embodiment of the invention a frame member of a watthour meter is provided with a pair of integrally formed, spaced-apart bosses thereon which each contain an open-ended channel that is adapted to receive one end of a generally straight spring member. The channels are substantially parallel and are positioned on opposite sides of a threaded bore in the frame member which is used to rotatably mount a full load calibrating screw that is operative to calibrate the degree of magnetic drag exerted by a permanent magnet on the rotatable disk of the induction meter. The calibrated screw has a tapered end and the pair of channels are effective to position a generally straight spring biasing member slightly to one side of the center of the threaded bore in which the screw is mounted. Accordingly, the screw can be partially inserted in the bore before it begins to mechanically load the spring member. In addition, the channels are formed so that they position the spring member at an angle to the longitudinal axis of the calibrating screw such that it is held in alignment with the threads cut in the screw.

DESCRIPTION OF THE DRAWINGS

FIG. 1 is a side elevation view, partially in cross section, of a watthour meter frame having an induction disk rotatably mounted thereon and including a full load calibrating screw assembly with a spring biasing means that is constructed pursuant to the teaching of the present invention.

FIG. 2 is a front plan view of a portion of the frame member illustrated in FIG. 1, showing the calibrating screw and spring member biasing means of the invention in enlarged detail.

FIG. 3 is a top plan view of a portion of the enlarged assembly shown in FIG. 2, illustrating the novel relationship that is maintained between a calibrating screw and a biasing spring utilized in the present invention.

DESCRIPTION OF A PREFERRED EMBODIMENT

Referring now to FIG. 1 of the drawing it will be seen that there is shown a watthour meter frame member 1 which may be die-cast or molded of any conventional material, such as a suitable conventional non-magnetic aluminum alloy. As is well known in the watthour meter art, the frame member 1 includes a pair of integral bearing bosses 2 and 3 for supporting the outer housing of a magnetic suspension bearing assembly 4, and a radial guide bearing member 5, respectively. The magnetic suspension assembly 4 includes an inner rotatably mounted magnet that is supported in fixed relation in a die-cast housing 4a with respect to the vertically positioned drive shaft 6 of the meter. An aluminum induction disk 7 is supported in fixed relationship on the shaft 6 by being staked thereto in any suitable well known manner. In the preferred embodiment of the invention described herein, the component parts 1–7, discussed thus far, are designed for use in a watthour meter; however, as the description of the invention proceeds it will be apparent that it may be adapted for use with other various different kinds of induction type electric meters. Also, it should be understood that although the invention is illustrated here with reference to only a few of the component parts of such an electric meter, in the normal operation of the invention it will be assembled in context with the remaining conventional parts of such a meter. Since such assemblies are well known in the art, and since they do not provide an important part of the present invention, they are not included in the illustration or description of the invention that is provided herein.

The frame member 1 includes a permanent magnet (not shown) which is die cast into it in a position such that an air gap in the magnet is disposed on opposite sides of the aluminum disk 7. An elongated, helically threaded screw 8 is mounted in a screw mounting means 9 that comprises a threaded bore, machined into an integral projection 1a on the housing 1 at a location such that the inner tapered end 8a of screw 8 is mounted adjacent the above mentioned magnet. This relationship of the screw 8 to the magnet affords a full load calibration means for the meter, since by rotating the screw 8 to move it parallel to the magnet the amount of flux shunted from the magnet through the screw 8 can be varied, thereby to adjust the amount of flux passing through the air gap of the magnet to produce a braking action on the disk 7. In order to afford such a manual adjustment of the screw 8, it is provided with an enlarged, flattened head portion 8b thereon for accommodating a screw driver or other conventional tool, which may be used to rotate the screw 8.

Pursuant to the invention, an elongated spring member 10 is resiliently biased against the threads of screw 8 to hold the screw in position against undesirable movement due to vibration of the meter. The spring member 10 is formed of a small-diameter bar or round rod, that is resiliently biased to have a generally straight configuration when it is unloaded and, as shown, it is mounted in a socket 11, one side of which is shown as the boss 12 in FIG. 1. A more complete description of the spring 10 and its mounting socket 11 will now be given with reference to FIGS. 2 and 3 of the drawing.

Referring to FIGS. 2 and 3 of the drawing, it will be seen that the socket 11 comprises a pair of spaced-apart bosses 12 and 13 that are disposed in fixed relationship on the frame member 1, of which they form an integral part. Pursuant to the invention, each of the bosses 12 and 13 includes means defining a pair of channels, 12a and 13a respectively, in each of the bosses 12 and 13. The channels 12a and 13a have one open end 12a' and 13a', respectively, and one closed end 12a'' and 13a'', respectively. Both of the channels 12a and 13a have a longitudinal axis that is generally parallel to the longitudinal axis of the screw 8 when it is mounted in the screw mounting means 9. As can be seen in FIGS. 2 and 3, the channels 12a and 13a are adapted to freely receive the elongated spring member 10 therein. However, it will be noted that the spring member 10 is substantially equal in length to the distance between the most widely spaced-apart walls of the two channels 12a and 13a measured along a straight line D (see FIG. 3) between the respective closed ends 12a'' and 13a'' of the channels. This novel feature of the present invention serves to readily position the spring member 10 in its operating position parallel to the threads that are helically cut in the screw 8. In other words, this novel positioning of the spring member 10 by the unique socket configuration of the invention serves to bias the spring member 10 against assuming a position transverse to the threads of the screw 8. Since in this preferred embodiment of the invention the spring member 10 is in the form of a thin rod which is formed to engage the two sides of one of the thread channels of screw 8, when the spring member 10 is aligned therewith, it should be apparent that the screw 8 may be manually rotated in either direction without dislodging the spring member from the socket 11. In addition, the spring member 10 is effective by its friction contact with the screw 8 to retain the screw in a set position against inadvertent movement.

A further novel feature of my invention is the provision of a first detent 14 and a second detent 15, which are positioned respectively adjacent the open ends of channels 12a and 13a. The detents 14 and 15 are arranged to allow the ends of the spring member 10 to pass freely into the channels 12a and 13a, while at the same time being operable to retain the spring member 10 from falling inadvertently from the channels 12a and 13a during assembly operations, prior to the time that the screw 8 is mounted in operating position to resiliently bias the spring member 10 to the position shown in FIG. 2. In this regard, it should be understood that when the socket 11 is in the vertical position shown in FIG. 2 and the screw 8 is removed from the assembly, the spring member 10 will straighten and drop down into a recessed area formed in the channels 12a and 13a respectively behind the restraining detents 14 and 15. Thus, these detents prevent the spring member 10 from rolling out of the socket 11 when the frame member 1 is transported or moved in a generally upright position during assembly operations.

An advantageous feature of the invention is that the tapered end 8a of screw 8 allows it to be partially inserted into the tapped bore of the screw mounting means 9 before the spring member 10 is resiliently loaded. Another novel feature of the invention is the provision of a stop-limit means 16, in the form of a boss that is mounted in fixed relationship on the frame member 1. In the preferred embodiment of the invention discussed herein, the boss 16 is molded integrally with the frame member 1. Of course, other configurations of the stop-limit means 16 may be used with alternative embodiments of the invention. It is only important to assure that the stop-limit means 16 be operable to engage the enlarged head portion 8b of screw 8 to prevent the screw 8 from being adjusted relative to the screw mounting means 9 to a position where the spring member 10 could lose contact with two sides of the threads cut in the screw 8. It will be appreciated that if the screw 8 were to be adjusted to allow the spring member 10 to ride out of the helical thread cut in the screw, into contact with the enlarged head portion 8b, the spring member 10 might be withdrawn from the socket 11 when the screw 8 was rotated to move it out of contact with the mounting means. Since the screw 8 will normally have a thread cut or rolled in only a portion of its length, such that the thread stops considerably short of the head portion 8b, it will be apparent that spring member 10 could easily be forced onto such an unthreaded shank portion 8c, as the screw 8 is rotated into mounting means 9, if it were not for the limiting effect of stop-limit boss 16. In the case of a cut thread, it is possible that a shoulder would be formed at the end of the thread, which could serve to hold spring member 10, if it were forced to ride over such a shoulder (in the absence of a stop-limit means 16) so that the spring member 10 could be withdrawn from the socket 11 when the screw 8 is rotated in a reverse direction to bias the shoulder against it.

From the foregoing description of the invention and the drawings appended hereto, it will be apparent to those skilled in the art that various modifications and improvements of the invention may be made without departing from its true scope. Accordingly, it is my intent to encompass all such obvious extensions of the invention within the limits of it that are defined with particularity in the following claims.

What we claim as new and desire to secure by letters patent of the United States is:

1. A full load calibration screw assembly for an induction-type electric meter comprising, an elongated spring member that is resiliently biased to have a generally straight configuration when it is unloaded, a socket adapted to hold said spring member, an elongated helically threaded screw, screw mounting means for mounting said screw adjacent the socket, said screw mounting means being effective when the screw is operably mounted therein to hold the screw against said spring member in a position that causes the spring member to be resiliently loaded, said spring member being positioned within the socket to have its longitudinal axis in alignment with one of the threads of said screw when the screw is positioned in operating position against the spring member, said spring member being formed to have a pair of contact surfaces that are shaped to engage respectively the two sides of said one of the thread channels of the screw when aligned therewith, whereby the screw may be manually rotated in either direction without dislodging the spring member from the socket, and whereby the spring member is effective by its friction contact with the screw to retain it in a set position against inadvertent movement.

2. An invention as defined in claim 1 wherein said screw has a tapered end that enables the screw to be moved past the spring member and partially inserted into the screw mounting means without causing resilient loading of the spring member.

3. An invention as defined in claim 1 wherein said socket comprises a pair of spaced-apart bosses disposed in fixed relationship on a frame member, means defining a channel having one open end and one closed end in each of said bosses, both of said channels having a longitudinal axis generally parallel to said screw when it is mounted in the screw mounting means, said channels being adapted to freely receive an end of the spring member therein, the length of one of said channels being greater than the length of the other channel thereby to position the spring member at an angle to the axis of the screw that is substantially parallel to the helical threads in the screw when the spring member is positioned against the closed ends of said channels.

4. An invention as defined in claim 3 wherein said spring member is substantially equal in length to the distance between the most widely spaced-apart walls of the two channels measured along a straight line between the respective closed ends of the channels, whereby the spring member is readily positioned in its operating position parallel to the threads of the screw by being moved into position against said end walls, and it is biased by said end walls against assuming a position transverse to the threads of the screw.

5. An invention as defined in claim 3 wherein said screw has a tapered end and is formed of magnetic material.

6. An invention as defined in claim 3 wherein a first and second detent are positioned respectively adjacent the open ends of said channels, said detents being arranged to allow the ends of the spring member to pass freely into the channels, and being operable to restrain the spring member from falling inadvertently from the channels during assembly operations, before the screw is mounted in its operating position.

7. An invention as defined in claim 3 wherein said screw includes an enlarged head portion that protrudes radially beyond the threads thereof, and including a stop-limit means mounted in fixed relationship on said frame member, said stop-limit means being operable to engage the enlarged head portion of the screw thereby to prevent it from being adjusted relative to the screw mounting means to a position where the spring member could lose contact with two sides of the thread on said screw.

8. An invention as defined in claim 5 in combination with a permanent magnet having an air gap therein, said permanent magnet being mounted in fixed relationship on said frame member adjacent the tapered end of said screw, whereby the amount of flux passing through said air gap can be adjusted by varying the position of the screw in relation to the magnet thereby to alter the flux shunting effect of the screw.

9. An invention as defined in claim 8 wherein said magnet is mounted in an induction-type watthour meter adjacent the rotatable induction disk thereof to provide a means for magnetically retarding the rotation of said disk.

* * * * *